United States Patent
Shimizu et al.

(10) Patent No.: US 6,978,686 B2
(45) Date of Patent: Dec. 27, 2005

(54) TORQUE SENSOR

(75) Inventors: Yasuo Shimizu, Wako (JP); Hisao Asaumi, Wako (JP); Shunichiro Sueyoshi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 96 days.

(21) Appl. No.: 10/658,832

(22) Filed: Sep. 8, 2003

(65) Prior Publication Data

US 2004/0050181 A1 Mar. 18, 2004

(30) Foreign Application Priority Data

Sep. 18, 2002 (JP) ........................................ 2002-271833

(51) Int. Cl.[7] .............................................. G01L 3/02
(52) U.S. Cl. .............................................. 73/862.335
(58) Field of Search .................... 73/862.331, 862.332, 73/862.333, 862.334, 862.335

(56) References Cited

U.S. PATENT DOCUMENTS

| | | | | |
|---|---|---|---|---|
| 4,627,298 A | * | 12/1986 | Sahashi et al. | 73/862.336 |
| 4,712,433 A | * | 12/1987 | Hochstein et al. | 73/862.334 |
| 5,131,281 A | | 7/1992 | Utsui et al. | |
| 5,562,004 A | * | 10/1996 | Kaise et al. | 73/862.336 |

FOREIGN PATENT DOCUMENTS

| | | |
|---|---|---|
| EP | 0 366 217 A2 | 5/1990 |
| JP | 59107229 | 6/1984 |
| JP | 06026950 | 2/1994 |
| JP | 2000019031 | 1/2000 |
| JP | 2001-133337 | 5/2001 |

* cited by examiner

*Primary Examiner*—Max Noori
(74) *Attorney, Agent, or Firm*—Merchant & Gould P.C.

(57) ABSTRACT

In a torque sensor having a magnetic metal film with magnetic anisotropy attached to a torque transmission shaft, and an exciting coil and a pair of detector coils each installed near the magnetic metal film, outputs of the detector coils and a reference signal are respectively added in waveform adders when the exciting coil is energized by an exciting power source. Then, the outputs of the adders and the reference signal are respectively compared in phase in phase comparators, and the outputs of the comparators are respectively converted in voltage values. A differential amplifier amplifies a difference between the voltage values, and a torque detector detects direction and magnitude of the torque applied to the torque transmission shaft from polarity and magnitude of the difference voltage value, thereby enabling to accurately detect applied torque even when installed near noise-producing electrical equipment such as an electric power steering system.

8 Claims, 7 Drawing Sheets

TORQUE SENSOR

BACKGROUND OF THE INVENTION

1. Field of the Invention

This invention relates to a torque sensor, particularly to a contactless (non-contact) magnetostrictive torque sensor.

2. Description of the Related Art

The contactless magnetostrictive torque sensor generally comprises a magnetic metal film exhibiting uniaxial magnetic anisotropy that is attached to a torque transmission shaft and an exciting coil and a detector coil each installed, at a location near the magnetostrictive film. Changes in inductance owing to permeability fluctuation produced in the magnetostrictive film by the applied torque are detected by the detector coil as potential differences from which the magnitude of the applied torque is detected.

A contactless magnetostrictive torque sensor of this type is taught, for instance, by Japanese Laid-Open Patent Application 2001-133337 (e.g., paragraph numbers 0036 to 0041, FIGS. 5 and 6, and elsewhere). This conventional torque sensor is used to detect steering torque produced in a vehicle electric power steering system that uses an electric motor to provide steering torque assistance.

A basic requirement of a torque sensor is that it should be able to accurately detect the magnitude and direction of torque applied to the torque transmission shaft. However, when a torque sensor is installed in an electric power steering system, as in the case of the prior art reference cited above, a particular problem arises owing to the fairly large amount of current passed through the electric motor. Specifically, noise produced by current passing through the motor is liable to degrade the detection accuracy when the level of the torque sensor detection current (voltage) is low. Many types of electrical equipment other than the electric power steering system also produce noise that can affect detection accuracy.

Further, when a torque sensor is used in the electric power steering system of a vehicle, for example, it is liable to become incapable of reliable detection owing to changes in its detection characteristics caused by extreme temperature variation in the vehicle running environment depending on the region and season, and because of exposure to heat generated by the motor or vehicle engine.

SUMMARY OF THE INVENTION

An object of this invention is therefore to provide a torque sensor that can accurately detect applied torque even when installed near noise-producing electrical equipment such as an electric power steering system, thereby achieving excellent in detection accuracy.

Another object of this invention is therefore to provide a torque sensor that is little affected by changes in the temperature of the use environment even when exposed to such changes and can therefore maintain a stable detection characteristic.

For achieving these objects, the invention provides, in one of its aspects, a torque sensor comprising: a magnetic metal film with magnetic anisotropy attached to a torque transmission shaft; an exciting coil and a detector coil each installed near the magnetic metal film; a detection circuit including an adder that adds an output of the detector coil and a reference signal when the exciting coil is energized by an exciting power source and a phase comparator that compares an output of the adder and the reference signal in phase; and a torque detector that detects a torque applied to the torque transmission shaft based on the output of the phase comparator.

For achieving this object, the invention provides, in another aspect, a torque sensor comprising: a magnetic metal film with magnetic anisotropy attached to a torque transmission shaft; an exciting coil and a plurality of detector coils each installed near the magnetic metal film; a detection circuit including a plurality of the adder that add respective outputs of the detector coils and the reference signal when the exciting coil is energized by the exciting power source, a plurality of the phase comparator that compare respective outputs of the adders and the reference signal in phase; and a differential amplifier that inputs respective outputs of the phase comparators and amplifies a difference between the outputs; and a torque detector detects a torque applied to the torque transmission shaft based on an output of the differential amplifier.

DETAILED DESCRIPTION OF THE PREFERRED EMBODIMENTS

A torque sensor according to an embodiment of the present invention will now be explained with reference to the attached drawings.

Figure 1:
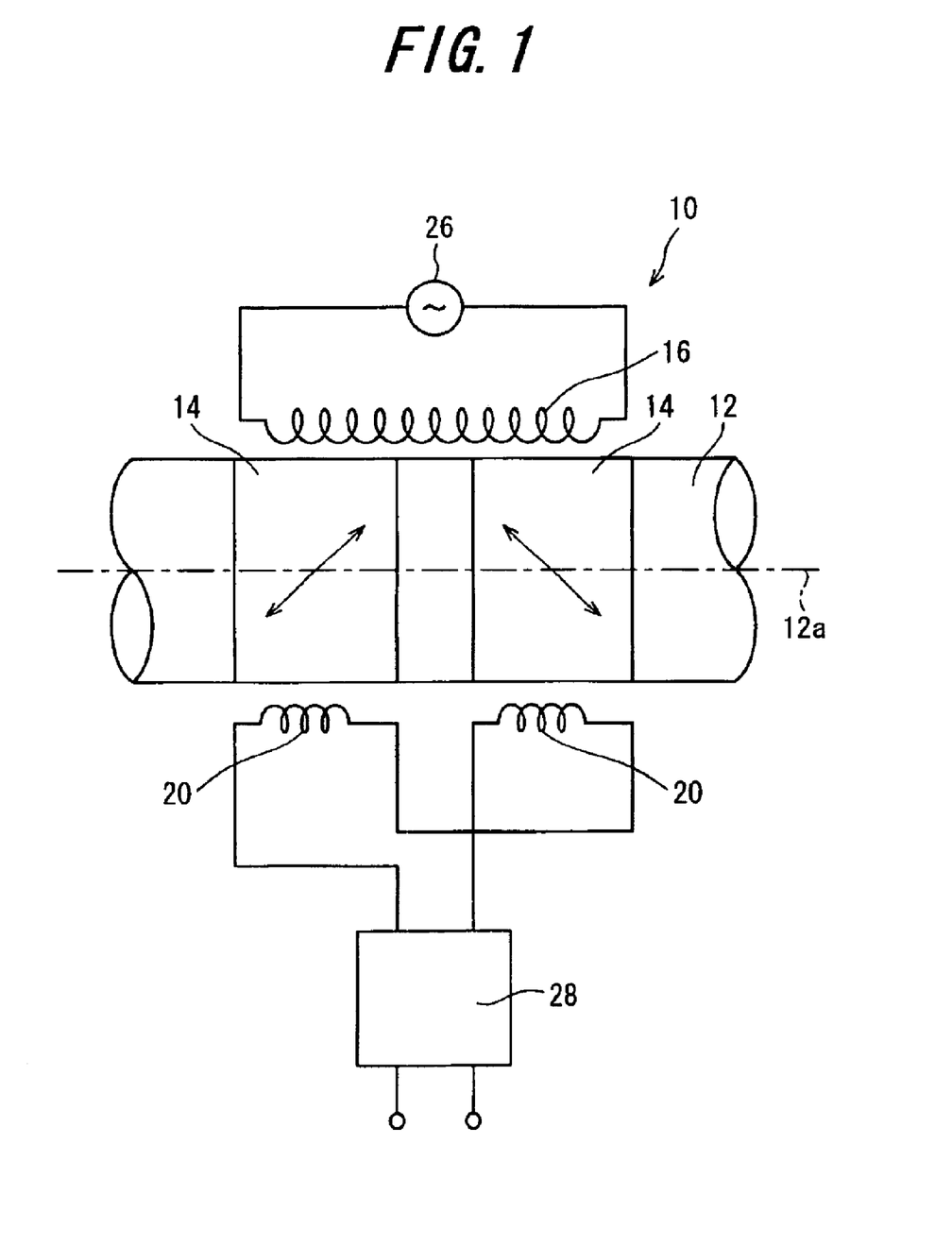
FIG. 1 is a schematic view of a torque sensor according to an embodiment of this invention.

FIG. 1 is a schematic view of a torque sensor according to an embodiment of this invention.

The torque sensor, designated by reference numeral 10 in the drawing, comprises a pair of magnetic metal films (magnetostrictive films) 14, an exciting coil 16 and a detector coil 20. The magnetic metal films 14, which exhibit magnetic anisotropy, are attached to a torque transmission shaft (rotating shaft) 12, and the exciting coil 16 and detector coil 20 are installed in close proximity to the films 14.

Each magnetic metal film 14 is fastened (bonded) to completely encircle the torque transmission shaft 12 over a prescribed width in the axial direction. The magnetic metal films 14 are made of a magnetic film material whose permeability varies markedly with stress-strain (compressive stress and tensile stress). They are, for example, made of a Ni—Fe-system alloy film formed on the outer periphery of the torque transmission shaft 12 by a wet plating method. The Ni—Fe-system alloy film is, for instance, composed of 50 to 60 wt % of Ni and the balance of Fe.

The torque transmission shaft 12 is formed of a material such as chrome-molybdenum steel (JIS (Japanese Industrial Standard)-G-4105, designated SCM) that contains substantially no Ni. As indicated by the double-headed arrows in the drawing, the magnetic metal films 14 are constituted to exhibit uniaxial magnetic anisotropy in directions lying ±45 degrees relative to the axis 12a of the torque transmission shaft 12.

The magnetic metal films 14 can be provided directly on the periphery of the torque transmission shaft 12 as explained above or first be formed on a separate pipe-like member and then be attached to the torque transmission shaft 12 as carried on the separate member. It will be obvious to a person skilled in the art the materials of the magnetic metal films 14 and the torque transmission shaft 12 are not limited to those mentioned in the foregoing.

The exciting coil 16 is wound on a magnetic core (not shown) located near the magnetic metal films 14 (and torque transmission shaft 12), specifically to be spaced therefrom by a distance of around 0.4–0.6 mm, and is energized by application of a high-frequency ac voltage of about 20–100 kHz from an exciting power source 26.

The detector coil 20 is wound on a magnetic core (not shown) located near the magnetic metal films 14 (and torque transmission shaft 12), specifically to be spaced therefrom by a distance of around 0.4–0.6 mm. The magnetic core of the exciting coil 16 and the magnetic core of the detector coil 20 are arranged to face each other from their locations near the magnetic metal films 14 (torque transmission shaft 12).

A magnetic circuit is formed between the torque transmission shaft 12 (and magnetic metal films 14) and the magnetic cores. When the exciting coil 16 is excited, a change in permeability in this magnetic circuit produced in proportion to stress-strain arising in the torque transmission shaft 12 in response to torque applied from the exterior generates a voltage composed of a self-induced voltage owing to change in the inductances of the exciting coil 16 and detector coils 20 and a mutually induced voltage. This small induced voltage is output across the output terminals of the detector coil 20. The output of the detector coil 20 is extracted through a synchronous rectifier 28 and, as explained later, is used to detect or determine the direction and magnitude of the applied torque.

Figure 2:
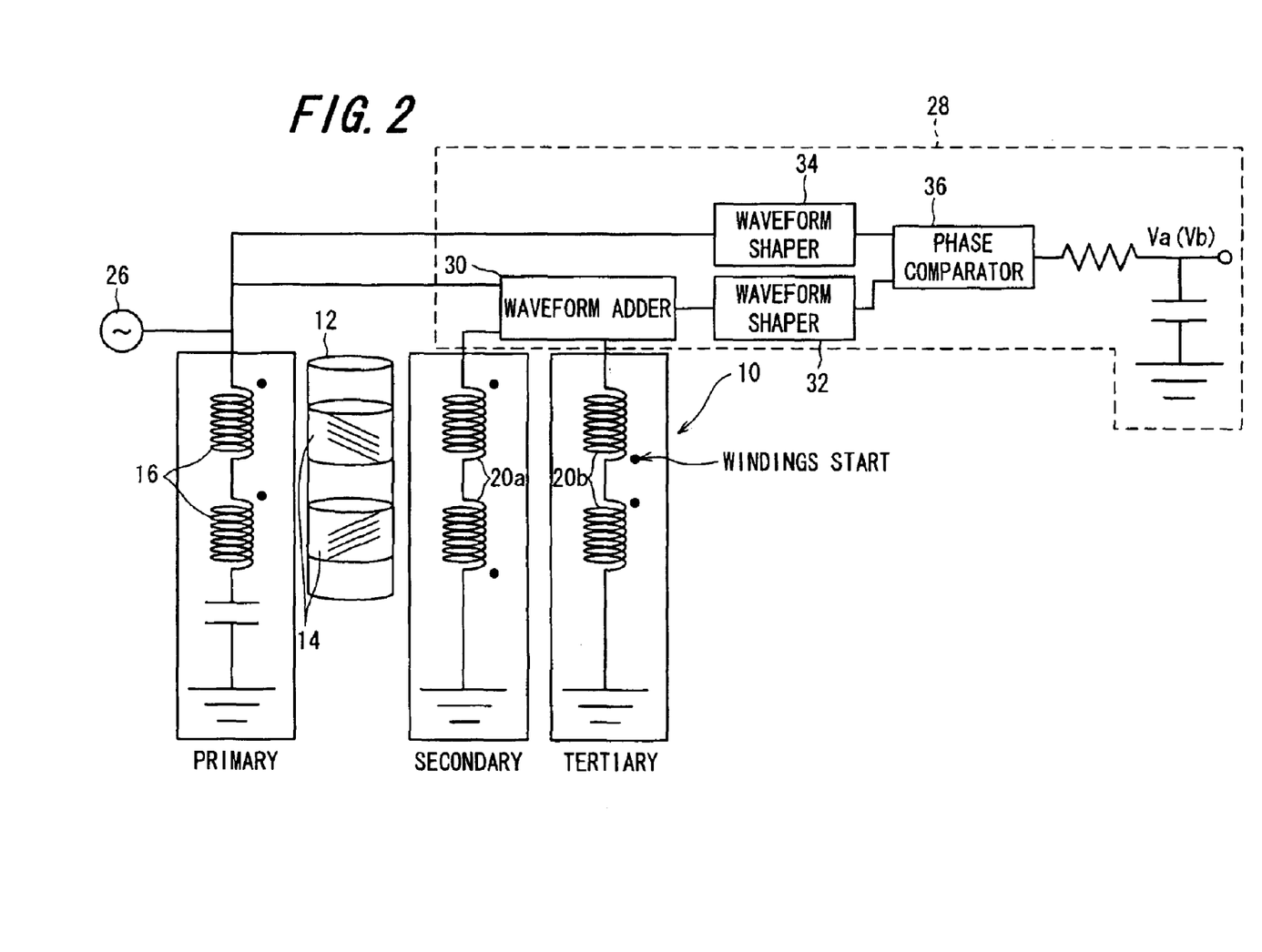
FIG. 2 is a block diagram showing the structure of the torque sensor of FIG. 1 in detail.

FIG. 2 is a block diagram showing the structure of the torque sensor of FIG. 1 in detail.

As shown, the detector coil 20 of this embodiment comprises a first detector coil 20a (designated "secondary" in the drawing) and a second detector coil 20b (designated "tertiary"). The exciting coil 16 is designated "primary."

The exciting coil 16 is connected to the exciting power source 26 and excited by application of a high-frequency voltage therefrom. When torque is applied, a small voltage proportional to the applied torque is output by the first and second detector coils 20a, 20b. The positions where the windings start differ between the first and second detector coils 20a, 20b. The first and second detector coils 20a, 20b are therefore differentially connected.

As illustrated in FIG. 2, the torque sensor 10 according to this embodiment has a detection circuit 28 comprising a waveform adder 30 that adds the outputs (waveforms) of the first detector coils 20a, 20b and a reference signal, first and second waveform shapers 32, 34 that waveform-shapes the output of the waveform adder 30 and the reference signal, respectively, and a phase comparator 36 that compares, in phase, the outputs of the first and second waveform shapers 32, 34. The direction and magnitude of the applied torque is detected or determined from the output of the phase comparator 36. The output of the exciting power source 26 can be used as the reference signal without modification. In other words, the exciting power source 26 also functions as a reference signal generator for producing the reference signal.

Figure 3:
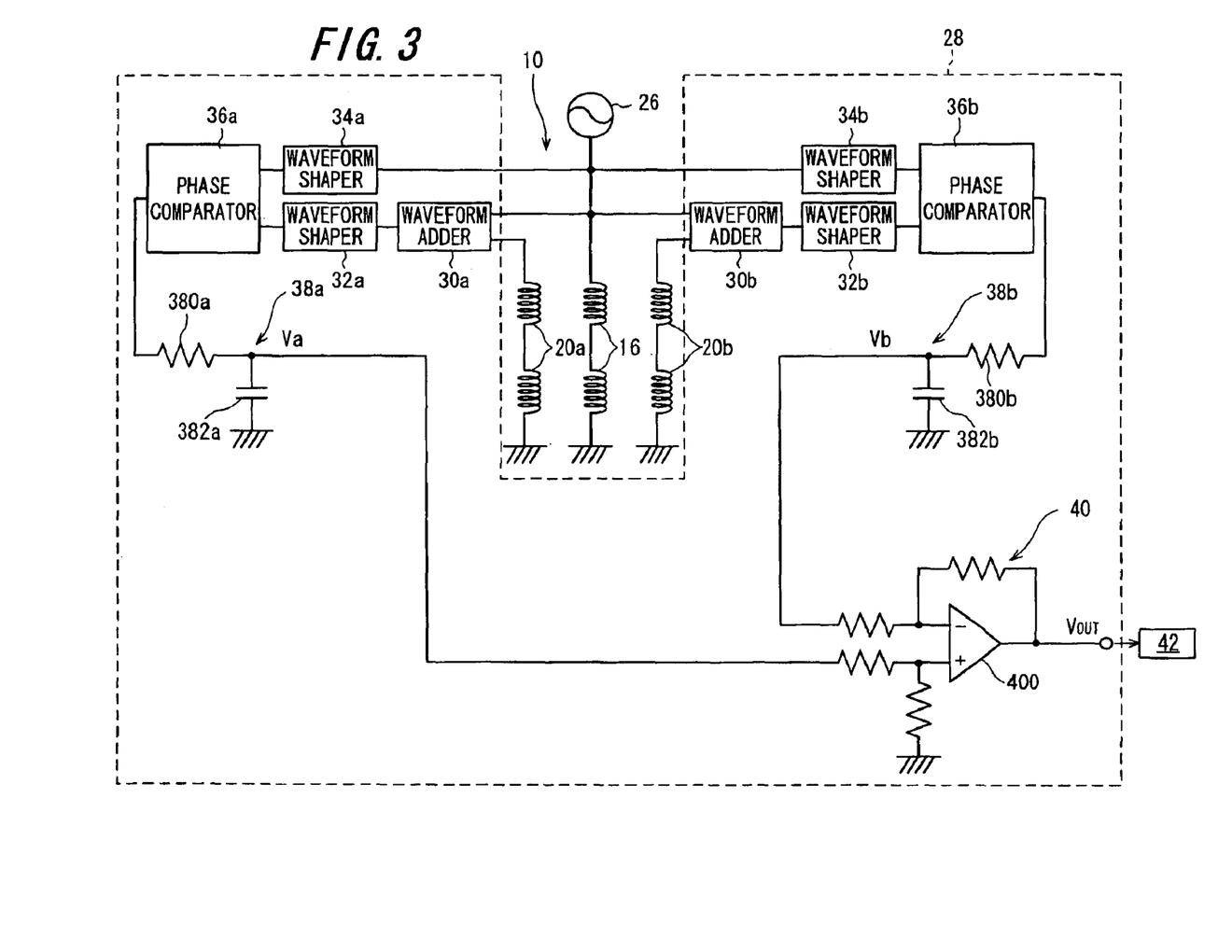
FIG. 3 is a block diagram showing the configuration of a detection circuit of FIG. 2 in greater detail.

FIG. 3 is a block diagram showing the configuration of the detection circuit 28 of FIG. 2 in greater detail.

Specifically, the detection circuit 28 comprises a plurality or plural sets of, specifically two sets of waveform adders (first waveform adder 30a, second waveform adder 30b) that add the respective outputs of the first and second detector coils 20a, 20b and the reference signal respectively when the exciting coil 16 is energized; a plurality or plural sets of, specifically two sets of waveform shapers (first and second waveform shapers 32a, 32b and 34a, 34b) that waveform-shape the respective outputs (waveforms) of the waveform adders 30a, 30b and the reference signal and output as waveform-shaped pulses respectively; a plurality or plural sets of, specifically two sets of phase comparators (first phase comparator 36a, second phase comparator 36b) that compare the respective outputs (pulses) of the waveform shapers 32a, 34a, 32b, 34b and the reference signal in phase and output the results of the comparison as pulses respectively; a plurality or plural sets of, specifically two sets of integrating circuits (first integrating circuit 38a, second integrating circuit 38b) that D/A convert, i.e., convert the outputs of the respective first and second phase comparators 36a, 36b, more exactly, the respective pulse outputs thereof into voltage values; and a differential amplifier 40 that inputs the voltage values Va, Vb resulting from the voltage conversion in the integrating circuits 38a, 38b and amplifies the difference between them.

More specifically, in the detection circuit 28, the first waveform adder 30a adds the outputs of the first detector coil 20a and the reference signal when the exciting coil 16 is energized. Then, the waveform shaper 32a of the first set waveform-shapes the output of the first waveform adder 30a, while the waveform shaper 34a of the first set waveform-shapes the reference signal and output as waveform-shaped pulses. Then, the first phase comparator 36a compares the outputs of the first set of waveform shapers 32a, 34a in phase and outputs the result of the comparison as a pulse. Then, the first integrating circuit 38a converts the pulse output of the first phase comparator 36a into voltage value Va. The devices of the second set act in the similar manner such that the second integrating circuit 38b converts the pulse output of the second phase comparator 36b into voltage value Vb. Then, the differential amplifier 40 inputs the voltage values Va, Vb resulting from the voltage conversion in the first and second integrating circuits 38a, 38b and amplifies the difference between them.

The output Vout of the differential amplifier 40 is sent to a torque detector 42 constituted, for example, as a microcomputer that uses it to detect or determine the direction and magnitude of the applied torque. Thus, the direction and magnitude of the applied torque are determined from the polarity and magnitude of the output (output voltage) of the differential amplifier 40.

Figure 4:
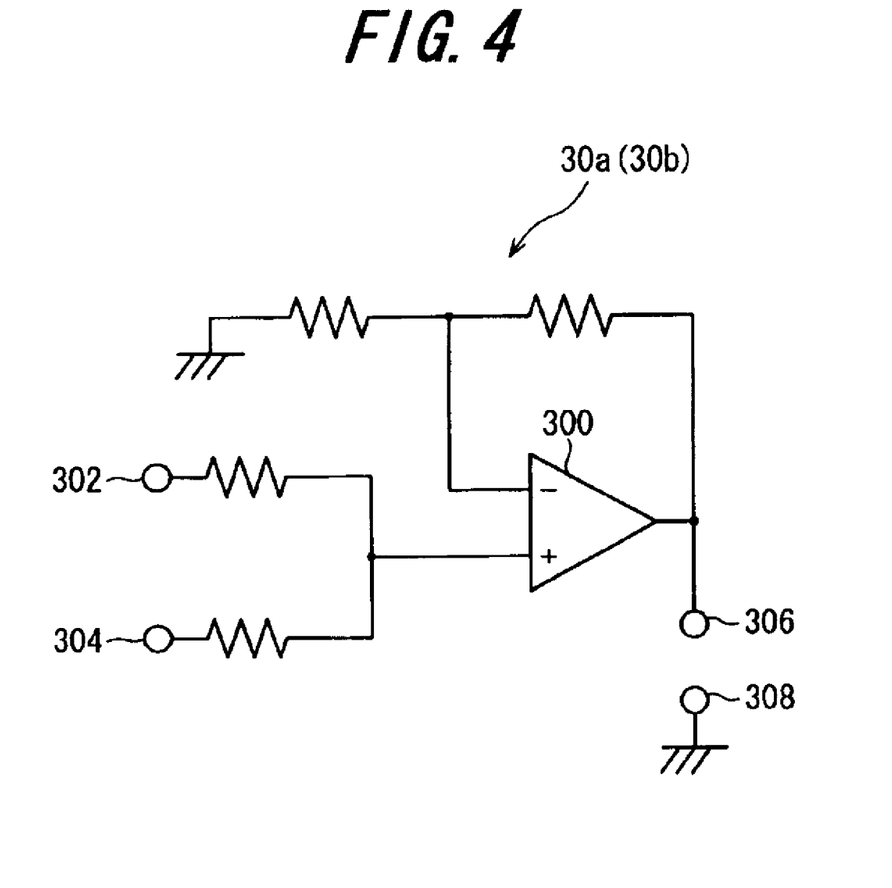
FIG. 4 is a circuit diagram showing the configuration of a waveform adder of FIG. 3 in greater detail.

As shown in FIG. 4, the waveform adders 30a, 30b are each equipped with an operational amplifier 300 whose noninverting input terminal is connected through resistors to input terminals 302, 304 and whose inverting input terminal is connected to ground through a voltage divider circuit. Owing to this configuration, the reference signal and the detector coil output received through the input terminals 302, 304 are added and the sum is output across output terminals 306, 308.

The first and second waveform shapers 32, 34 can be configured as conventional Schmitt trigger circuits, for example, and the phase comparator 36 can be configured as an EXCLUSIVE-OR gate. The integrating circuits 38a, 38b comprises resistors 380a, 380b and capacitors 382a, 382b inserted between them and ground terminals. The differential amplifier 40 is equipped with an operational amplifier 400. The integrating circuits 38a, 38b and the differential amplifier 40 are of known configurations.

Figure 5:
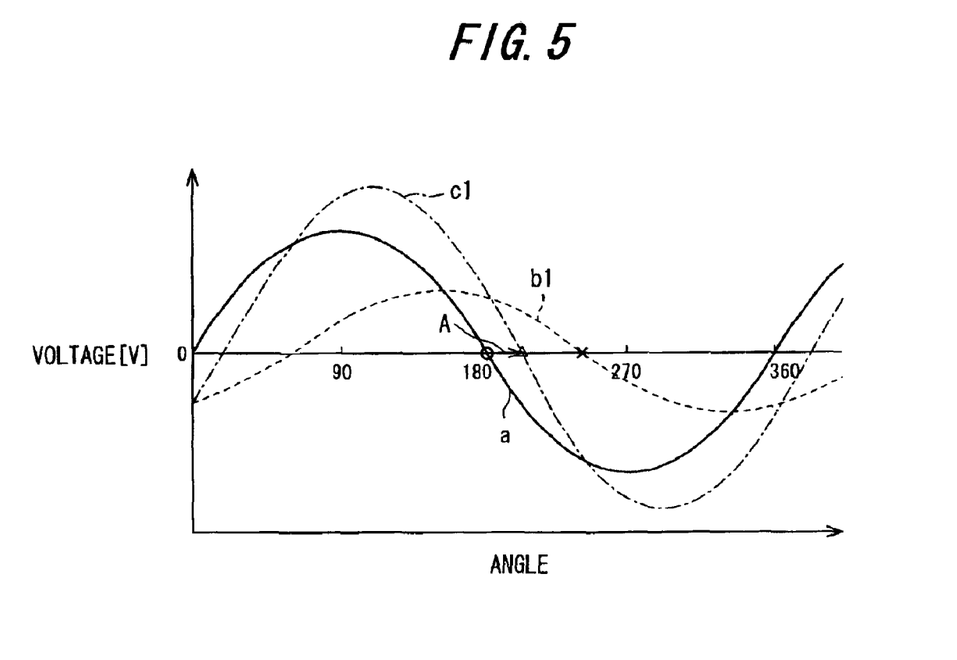
FIG. 5 is a graph exemplifying the output of a detector coil produced in proportion to compression stress and tensile stress occurring in magnetic metal films when an applied torque is input to the torque transmission shaft in the clockwise direction.
Figure 6:
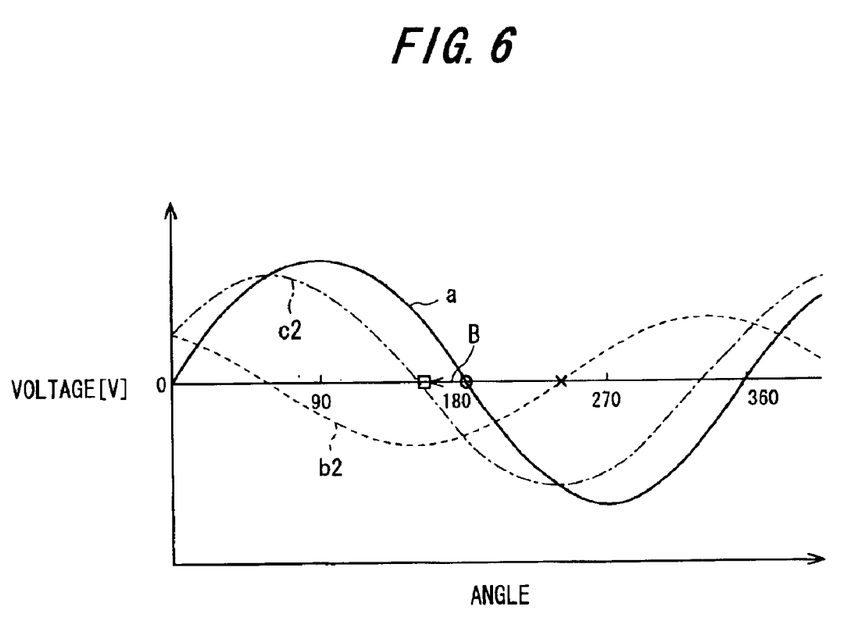
FIG. 6 is a graph similarly exemplifying the output of the detector coil when an applied torque is input to the torque transmission shaft in the counterclockwise direction.

FIG. 5 is a graph exemplifying the output of the detector coil 20 produced in proportion to compression stress and tensile stress occurring in the magnetic metal films 14 when an applied torque is input to the torque transmission shaft 12 in the clockwise direction. FIG. 6 is a graph exemplifying the output of the detector coil 20 when an applied torque is input to the torque transmission shaft 12 in the counterclockwise direction.

The waveforms designated a in FIGS. 5 and 6 represent the reference signal (indicative of reference waveform or reference phase), the waveforms designated b1, b2 represent the detected waveforms, and the waveforms designated c1, c2 represent the sum waveforms obtained by adding the reference signal and the detected waveforms. The phases of the detected waveform b2 in FIG. 6 and the detected waveform b1 in FIG. 5 differ by 180 degrees in phase and, as shown by A and B in FIGS. 5 and 6, are opposite in direction.

The added waveforms (added values) c1, c2 shown in FIGS. 5 and 6 are sent to the phase comparators 36a, 36b, which again compare their phases with that of the reference signal and output pulses in accordance with the direction and amount of the deviations thereof.

In the torque sensor 10 of this embodiment, the values obtained by adding the outputs of the detector coils and the reference signal are compared in phase with the reference signal, and the applied torque is determined from the value obtained by amplifying the differences output as the comparison results. Therefore, even if the detected output is of about the same voltage as that of a torque sensor of the prior art, the torque sensor 10 is little affected by noise from other electrical equipment and improved detection accuracy can be realized, since the ensuing amplification by the differential amplifier 40 can be lowered to $1/20$, for example.

Since the applied torque is detected from the value obtained by amplifying the difference between the values obtained by comparing the values in phase, the torque sensor 10 is little affected by temperature change. Owing to the inclusion of two detector coil 20 systems, moreover, discrimination of torque sensor 10 failure or malfunction can be easily achieved by, for instance, comparing the output of the detector coil 20a and the output of the detector coil 20b as absolute values and checking whether they are within a prescribed range. Further, the configuration is simplified by the direct use of the output of the exciting power source 26 as the reference signal.

Figure 7:
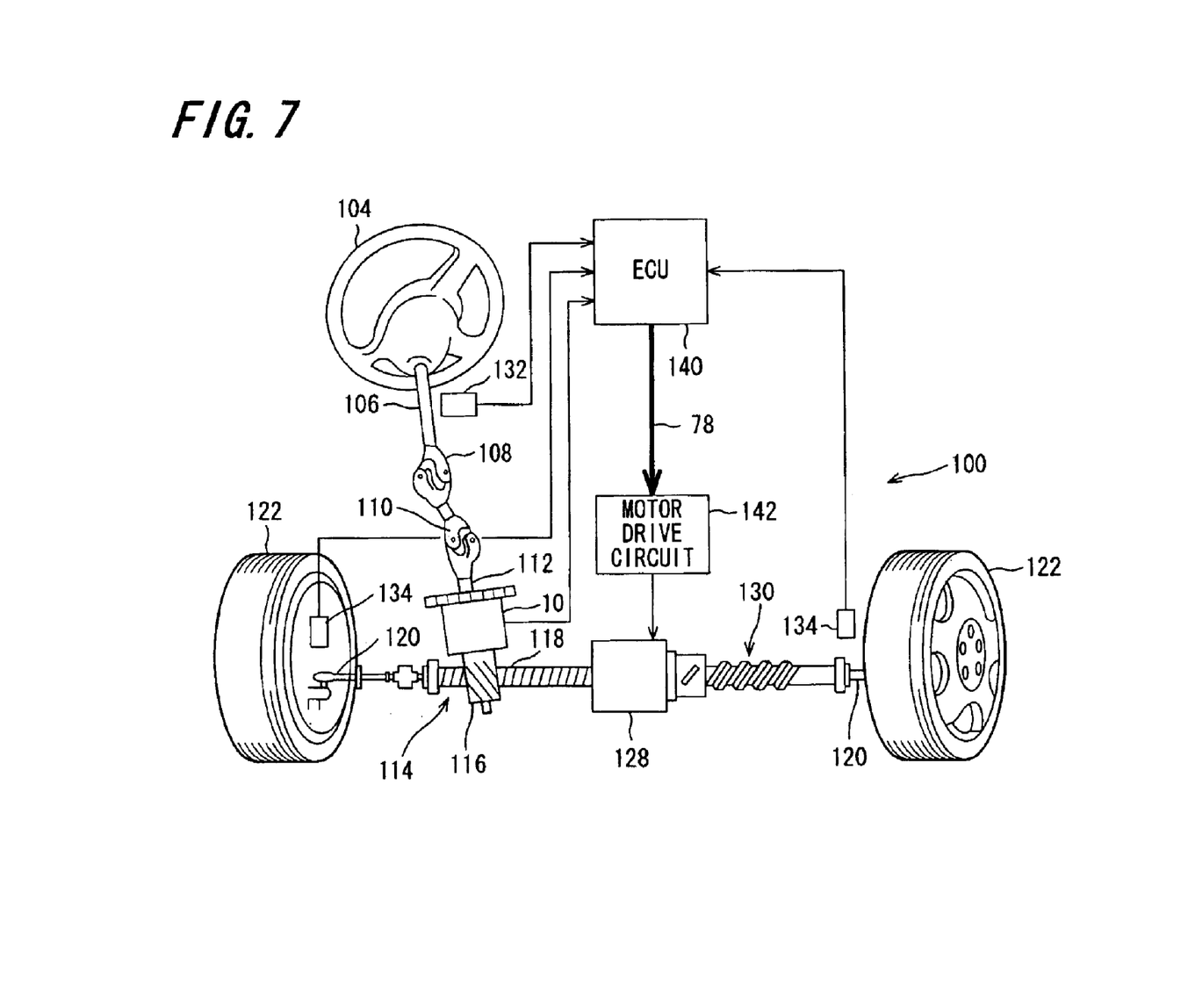
FIG. 7 is an explanatory view showing a torque sensor according to a second embodiment of the invention, in which the torque sensor according to the first embodiment is used as a torque sensor for detecting the steering torque of a vehicle electric power steering system that uses an electric motor to provide steering torque assistance.

FIG. 7 is an explanatory view showing the torque sensor according to a second embodiment of the invention, in which the torque sensor according to the first embodiment is used as a torque sensor for detecting the steering torque of a vehicle electric power steering system that uses an electric motor to provide steering torque assistance.

Explaining this with reference to the figure, a steering wheel 104 located at the operator's seat of a vehicle 100 is connected to a steering shaft 106 that is connected to a connecting shaft 112 through universal joints 108, 110.

The connecting shaft 112 is connected to a pinion 116 of a rack-and-pinion steering gear 114. The pinion 116 is meshed with a rack 118 of the steering gear 114 so that rotational motion input from the steering wheel 104 is transmitted through the pinion 116 to be converted into reciprocal motion of the rack 118 for steering two wheels 122 (steered wheels) in a desired direction through tie rods (steering rods) 120 and kingpins (not shown) installed at opposite ends of the front axle.

An electric motor 128 and a ball screw mechanism 130 are installed coaxially on the rack 118. The motor output is transmitted through the ball screw mechanism 130 to be converted into reciprocal motion of the rack 118, thereby driving the rack 118 in the direction that assists (i.e., decreases) the steering torque (or steering force) input through the steering wheel 104.

The torque sensor 10 is installed near the steering gear 114 and outputs a signal representing the direction and magnitude of the steering torque (steering force) input by the operator. Further, a steering angle sensor 132 constituted as a rotary encoder or the like is provided near the steering shaft 106 for producing a signal representing the direction of the steering angle input by the operator.

Wheel speed sensors 134 constituted as magnetic pickups or the like are installed near the wheels 122. Each outputs a signal once per wheel revolution. Wheel speed sensors of the same type are also installed near the two rear wheels and output signals once per wheel revolution. The engine (not shown) of the vehicle 100 is mounted on the front wheel side. The wheels 122 are driving wheels and the rear wheels are trailing wheels.

Reference numeral 140 designates an ECU (Electronic Control Unit) constituted as a microcomputer. The outputs of the torque sensor 10 and the like are sent to the ECU 140. The ECU 140 uses the assist amount of the input steering torque to calculate a command value (in Pulse Width Modulation duty ratio) and outputs it to a motor drive circuit 142 to control the motor 128.

Owing to the foregoing configuration of the second embodiment, the torque sensor 10 used in the electric power steering system is little affected by noise from current passed through the motor 128 and can therefore achieve improved detection accuracy. In addition, its ability to maintain a stable detection characteristic that is little affected by temperature change ensures still better detection accuracy.

As set out in the foregoing, the first embodiment is configured, in a first aspect, to have a torque sensor 10, comprising: a magnetic metal film 14 with magnetic anisotropy attached to a torque transmission shaft 12; an exciting coil 16 and a detector coil 20 each installed near the magnetic metal film; a detection circuit 28 including an adder (waveform adder )30 that adds an output of the detector coil and a reference signal when the exciting coil 16 is energized by an exciting power source 26 and a phase comparator 36 that compares an output of the adder and the reference signal in phase; and a torque detector 42 that detects a torque applied to the torque transmission shaft based on the output of the phase comparator.

Thus, the output of the detector coil and the reference signal are added when the exciting coil is energized, the phases of the sum value and the reference signal are compared, and the torque applied to the torque transmission shaft, more exactly the direction in which the torque is applied and the magnitude of the applied torque, are detected from the comparison result output, more exactly from the polarity and magnitude of voltage value obtained by voltage-converting the comparison result output. In other words, since the applied torque is detected from the output representing the phase difference between the detected output and the reference signal, the detection accuracy can be enhanced even when the detection current is weak because the detection is little affected by noise from other electrical equipment and the like.

As shown in FIG. 3, the first embodiment is provided with two each of the detector coil 20, waveform adder 30, phase comparator 36, integrating circuit 38 and the like, but it is possible instead to provide only one of each. In such case, the applied torque is detected from the output Va (or Vb) of the integrating circuit 38. The first aspect of the invention is described based on this configuration.

The first embodiment is also configured to have a torque sensor 10, comprising: a magnetic metal film 14 with magnetic anisotropy attached to a torque transmission shaft 12; an exciting coil 16 and a plurality of detector coils 20a, 20b each installed near the magnetic metal film; a detection circuit 28 including a plurality of the adder (waveform adder) 30a, 30b that add respective outputs of the detector coils and the reference signal when the exciting coil 16 is energized by the exciting power source 26, a plurality of the phase comparator 36a, 36b that compare respective outputs of the adders and the reference signal in phase; and a differential amplifier 40 that inputs respective outputs of the phase comparators and amplifies a difference between the outputs; and a torque detector 42 detects a torque applied to the torque transmission shaft based on an output of the differential amplifier.

Thus, the outputs of the respective detector coils and the reference signal are added when the exciting coil is energized, the sums are each compared in phase with the reference signal, and the applied torque is detected from the value obtained by amplifying the differences output as the comparison results. Therefore, similarly to what is explained regarding above, the detection is little affected by noise from other electrical equipment and the like even when the detected current is weak, and in addition, the detection is little affected by temperature changes because the applied torque is determined from values obtained by amplifying the differences of multiple, specifically two, comparison results. Since a stable detection characteristic can therefore be obtained, a still greater improvement of detection accuracy can be achieved.

In the torque sensor, the detection circuit (28) further includes a plurality of integrating circuits (38a, 38b) that convert the respective outputs of the phase comparators in voltage values (Va, Vb), the differential amplifier (40) inputs the voltage values resulting from voltage conversion in the integrating circuits and amplifies a difference between the voltage values, and the torque detector (42) detects direction and magnitude of the torque applied to the torque transmission shaft from polarity and magnitude of the difference voltage value.

In the torque sensor, the detection circuit (28) further includes a plurality of waveform shapers (32a, 32b, 34a, 34b) that waveform-shape the respective outputs of the (waveform) adder (30a, 30b) and the reference signal.

In the torque sensor, the reference signal is generated by the exciting power source 26. Since the reference signal is the output of the exciting power source of the exciting coil, in other words, no generator is required for producing the reference signal, the configuration is simpler in proportion.

The second embodiment is also configured such that torque sensor 10 is installed in a vehicle electric power steering system that uses an electric motor 128 to provide steering torque assistance and detects the steering torque of the vehicle electric power steering system. Thus, the torque sensor is incorporated into an electric power steering system. Susceptibility to noise from current passed through the electric motor of the electric power steering system is low, a detection characteristic that is stable against temperature change can be realized.

As shown in FIG. 3, the first embodiment is provided with two each of the detector coil 20, waveform adder 30, phase comparator 36, integrating circuit 38 and the like, but it is possible instead to provide three or more of each.

As shown in FIGS. 2 and 3, the first embodiment is provided with the first and second waveform shapers 32a, 32b, 34a, 34b, but they can be omitted because they are not always indispensable for the torque sensor of this invention.

Although the reference signal is output by the exciting power source 26, it is alternatively possible to provide a reference signal generator separately of the exciting power source 26 for this purpose.

The entire disclosure of Japanese Patent Application Nos. 2002-271833 filed on Sep. 18, 2002, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A torque sensor, comprising:
   a magnetic metal film with magnetic anisotropy attached to a torque transmission shaft;
   an exciting coil and a detector coil each installed near the magnetic metal film;
   a detection circuit including an adder that adds an output of the detector coil and a reference signal when the exciting coil is energized by an exciting power source and a phase comparator that compares an output of the adder and the reference signal in phase; and
   a torque detector that detects a torque applied to the torque transmission shaft based on the output of the phase comparator.

2. A torque sensor according to claim 1, wherein the detection circuit further includes a waveform shaper that waveform-shapes the output of the adder and the reference signal.

3. A torque sensor according to claim 1, wherein the reference signal is generated by the exciting power source.

4. A torque sensor, comprising:
   a magnetic metal film with magnetic anisotropy attached to a torque transmission shaft;
   an exciting coil and a plurality of detector coils each installed near the magnetic metal film;
   a detection circuit including a plurality of adders that add respective outputs of the detector coils and the reference signal when the exciting coil is energized by the exciting power source, a plurality of phase comparators that compare respective outputs of the adders and the reference signal in phase and a differential amplifier that inputs respective outputs of the phase comparators and amplifies a difference between the outputs; and
   a torque detector detects a torque applied to the torque transmission shaft based on an output of the differential amplifier.

5. A torque sensor according to claim 4, wherein the detection circuit further includes a plurality of integrating circuits that convert the respective outputs of the phase comparators in voltage values, the differential amplifier inputs the voltage values resulting from voltage conversion in the integrating circuits and amplifies a difference between the voltage values, and the torque detector detects direction and magnitude of the torque applied to the torque transmission shaft from polarity and magnitude of the difference voltage value.

6. A torque sensor according to claim 4, wherein the detection circuit further includes a plurality of waveform shapers that waveform-shape the respective outputs of the adder and the reference signal.

7. A torque sensor according to claim 4, wherein the reference signal is generated by the exciting power source.

8. A torque sensor according to claim 4, wherein the torque sensor is installed in a vehicle electric power steering system that uses an electric motor to provide steering torque assistance and detects the steering torque of the vehicle electric power steering system.

* * * * *